US011036313B2

(12) United States Patent
Chang

(10) Patent No.: US 11,036,313 B2
(45) Date of Patent: Jun. 15, 2021

(54) STYLUS, CIRCUIT SYSTEM, CONTROL CIRCUIT AND METHOD THEREOF FOR POWER SAVING

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 16/369,374

(22) Filed: Mar. 29, 2019

(65) Prior Publication Data
US 2019/0302909 A1    Oct. 3, 2019

(30) Foreign Application Priority Data
Apr. 3, 2018 (TW) ................ 107112020

(51) Int. Cl.
G06F 3/0354 (2013.01)
G06F 3/038 (2013.01)
G06F 1/3296 (2019.01)
H02J 7/00 (2006.01)
H02M 3/07 (2006.01)

(52) U.S. Cl.
CPC ........ *G06F 3/03545* (2013.01); *G06F 1/3296* (2013.01); *G06F 3/0383* (2013.01); *H02J 2007/0067* (2013.01); *H02J 2207/20* (2020.01); *H02M 3/07* (2013.01)

(58) Field of Classification Search
None
See application file for complete search history.

(56) References Cited

U.S. PATENT DOCUMENTS 8,179,698 B2    5/2012  Jang et al.
2017/0083119 A1 *  3/2017  Jensen ................ G06F 3/03545

FOREIGN PATENT DOCUMENTS

TW          201004112         1/2010

* cited by examiner

*Primary Examiner* — Carl Adams
(74) *Attorney, Agent, or Firm* — WPAT, PC

(57) ABSTRACT

The present invention provides a circuit system for saving power, including: a battery for supplying power; a boost converter circuit, coupled to the battery, for increasing voltage of direct current outputted from the battery; a switch circuit including a first end and a second end, the first end coupled to the boost converter circuit; a load circuit, coupled to the second end; a capacitor, coupled to the second end, for storing and discharging electric power for solely supplying the load circuit; and a control circuit, coupled to the boost converter circuit and the switch circuit, for implementing the following steps: if the voltage of the second end is less than a first voltage, enabling the boost converter circuit and having the switch circuit connect the first and the second ends; and if the voltage of the second end is larger than a second voltage, disabling the boost converter circuit and having the switch circuit disconnect the first and the second ends, wherein the second voltage is larger than the first voltage.

10 Claims, 8 Drawing Sheets

STYLUS, CIRCUIT SYSTEM, CONTROL CIRCUIT AND METHOD THEREOF FOR POWER SAVING

CROSS REFERENCE TO RELATED APPLICATION

The application claim priority benefit of Taiwan patent application, 107112020, which was filed on Apr. 3, 2018.

BACKGROUND OF THE INVENTION

1. Field of the Invention

The present invention relates to the field of power-saving circuit, and more particularly, to a boost converter circuit and system for saving power.

2. Description of the Prior Art

In modern times, when large touch screens or panels are gaining popularity, a stylus that can actively emit electrical signals from its tip can effectively enhance user experience. Because the controller of the touch screen has more accurate access to the position of the stylus than a stylus that does not emit electrical signals or passively emit electrical signals.

Applicant has filed many patent applications for active stylus, such as Taiwan patent No. I540472 and its domestic and foreign related cases, as well as the Taiwan patent application, public number 201519018 application and its division and domestic and foreign counterparts, etc. In these applications, a variety of detection techniques of electrical signals for active styluses actively emitting electrical signals and their associated touch sensitive processing apparatuses are provided. One of the disclosed techniques is to calculate the pressure value of the stylus tip by using the proportion of signal strength received at different frequencies or at different times. In this technique, the stylus does not need to first digitally convert the pressure values received by the stylus, electrical signals can be used to represent the pressure values.

The active stylus must consume electrical energy before it can emit electrical signals. Therefore, how to save the energy consumption of the stylus and prolong the time interval for replacing the battery or charging has always been one of the key points in the design of the active stylus. Referring to FIG. 1, a schematic block diagram for an existing stylus 100 is illustrated. The stylus 100 includes a battery 110, a boost converter circuit 120, a switch circuit 130, and a load circuit 140. These components are common grounded, so omit not to draw. The boost converter circuit 120 can be a DC/DC converter, a charge pump, or another boost converter circuit 120, which is responsible for converting the lower DC voltage outputted from the battery 110 to a higher DC voltage. The output of the boost converter circuit 120 is provided to the load circuit 140 through the switch circuit 130. In one example, the load circuit 140 can include the circuit that emits the electrical signal described in the aforementioned patent applications.

When the stylus 100 does not need to emit an electrical signal, the switch circuit 130 isolates the load circuit 140 from the boost converter circuit 120. However, the boost converter circuit 120 continues to consume the electrical power of the battery 110 without load, and the electrical power consumed by the DC/DC converter or the charge pump circuit in operating is quite large. If the switch circuit 130 is designed between the battery 110 and the boost converter circuit 120, then when the stylus 100 needs to emit an electrical signal, the voltage outputted from the battery 110 must take a long time to be pulled up to a higher voltage by the boost converter circuit 120. For the user, the stylus does not work within this delay time, resulting in a poor user experience.

Therefore, how to make the active stylus switch faster from the power-saving mode to the working mode, but also to save the active stylus's usual energy consumption, is one of the problems to be solved in this application.

SUMMARY OF THE INVENTION

According to an embodiment of the present invention, it provides a stylus for saving power. The stylus includes: a battery for supplying power to the stylus; a boost converter circuit, coupled to the battery, for increasing voltage of direct current outputted from the battery; a switch circuit including a first end and a second end, the first end coupled to an output of the boost converter circuit; a load circuit, coupled to the second end of the switch circuit, for emitting an electrical signal to a touch screen or panel to have a touch sensitive processing apparatus of the touch screen or panel know a position of the stylus on the touch screen or panel according to the electrical signal; a capacitor, coupled to the second end of the switch circuit, for storing and discharging electric power for solely supplying the load circuit; and a control circuit, coupled to the boost converter circuit and the switch circuit, for implementing the following steps: if the voltage of the second end is less than a first voltage, enabling the boost converter circuit and having the switch circuit connect the first and the second ends; and if the voltage of the second end is larger than a second voltage, disabling the boost converter circuit and having the switch circuit disconnect the first and the second ends, wherein the second voltage is larger than the first voltage.

According to an embodiment of the present invention, it provides a circuit system for saving power. The circuit system includes: a battery for supplying power; a boost converter circuit, coupled to the battery, for increasing voltage of direct current outputted from the battery; a switch circuit including a first end and a second end, the first end coupled to an output of the boost converter circuit; a load circuit, coupled to the second end of the switch circuit; a capacitor, coupled to the second end of the switch circuit, for storing and discharging electric power for solely supplying the load circuit; and a control circuit, coupled to the boost converter circuit and the switch circuit, for implementing the following steps: if the voltage of the second end is less than a first voltage, enabling the boost converter circuit and having the switch circuit connect the first and the second ends; and if the voltage of the second end is larger than a second voltage, disabling the boost converter circuit and having the switch circuit disconnect the first and the second ends, wherein the second voltage is larger than the first voltage.

In the embodiment, for implementing the boost converter circuit, wherein the boost converter circuit includes one of or any combination of the following: DC/DC converter; and charge pump.

In the embodiment, for implementing the switch circuit, wherein the switch circuit includes a diode.

In the embodiment, for directly outputting electric power to the load circuit, wherein the voltage outputted from the capacitor is larger than the voltage outputted from the battery. It can fall on the operating voltage range of the load circuit.

According to an embodiment of the present invention, it provides a control circuit for saving power which is applicable to a circuit system. Wherein the circuit system includes: a battery for supplying power; a boost converter circuit coupled to the battery; a switch circuit; a load circuit coupled to the switch circuit; and a capacitor coupled to the switch circuit. Wherein the boost converter circuit increases voltage of direct current outputted from the battery, the switch circuit includes a first end and a second end, the first end couples to an output of the boost converter circuit, the second end couples to the load circuit and the capacitor. Wherein the control circuit includes: a voltage comparator circuit, comparing the voltage of the second end of the switch circuit with a certain voltage; and a logic circuit, receiving comparison results of the voltage comparator circuit, if the voltage of the second end is less than a first voltage, enabling the boost converter circuit and having the switch circuit connect the first and the second ends; and if the voltage of the second end is larger than a second voltage, disabling the boost converter circuit and having the switch circuit disconnect the first and the second ends such that the capacitor discharging stored electric power for solely supplying the load circuit, wherein the second voltage is larger than the first voltage.

According to an embodiment of the present invention, it provides a control method for saving power which is applicable to a circuit system. Wherein the circuit system includes: a battery for supplying power; a boost converter circuit coupled to the battery; a switch circuit; a load circuit coupled to the switch circuit; and a capacitor coupled to the switch circuit. Wherein the boost converter circuit increases voltage of direct current outputted from the battery, the switch circuit includes a first end and a second end, the first end couples to an output of the boost converter circuit, the second end couples to the load circuit and the capacitor. Wherein the control method includes: if the voltage of the second end is less than a first voltage, enabling the boost converter circuit and having the switch circuit connect the first and the second ends; and if the voltage of the second end is larger than a second voltage, disabling the boost converter circuit and having the switch circuit disconnect the first and the second ends such that the capacitor discharging stored electric power for solely supplying the load circuit, wherein the second voltage is larger than the first voltage.

In some embodiments, the circuit systems, control circuits, and control methods mentioned above can be applied to a stylus, especially to an active stylus. The load circuit described above is used to emit an electrical signal to a touch screen or panel so that a touch sensitive processing apparatus of the touch screen or panel knows the stylus's position on the touch screen or panel according to the electrical signal.

According to the styluses, circuit systems, control circuits and control methods provided in the present application, a boost converter circuit with a large power consumption can be turned off during the power is supplied by the capacitor. By doing so, not only can the active stylus or circuit system switch faster from the power-saving mode to the working mode, but the energy consumption of the active stylus or circuit system also can be saved.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
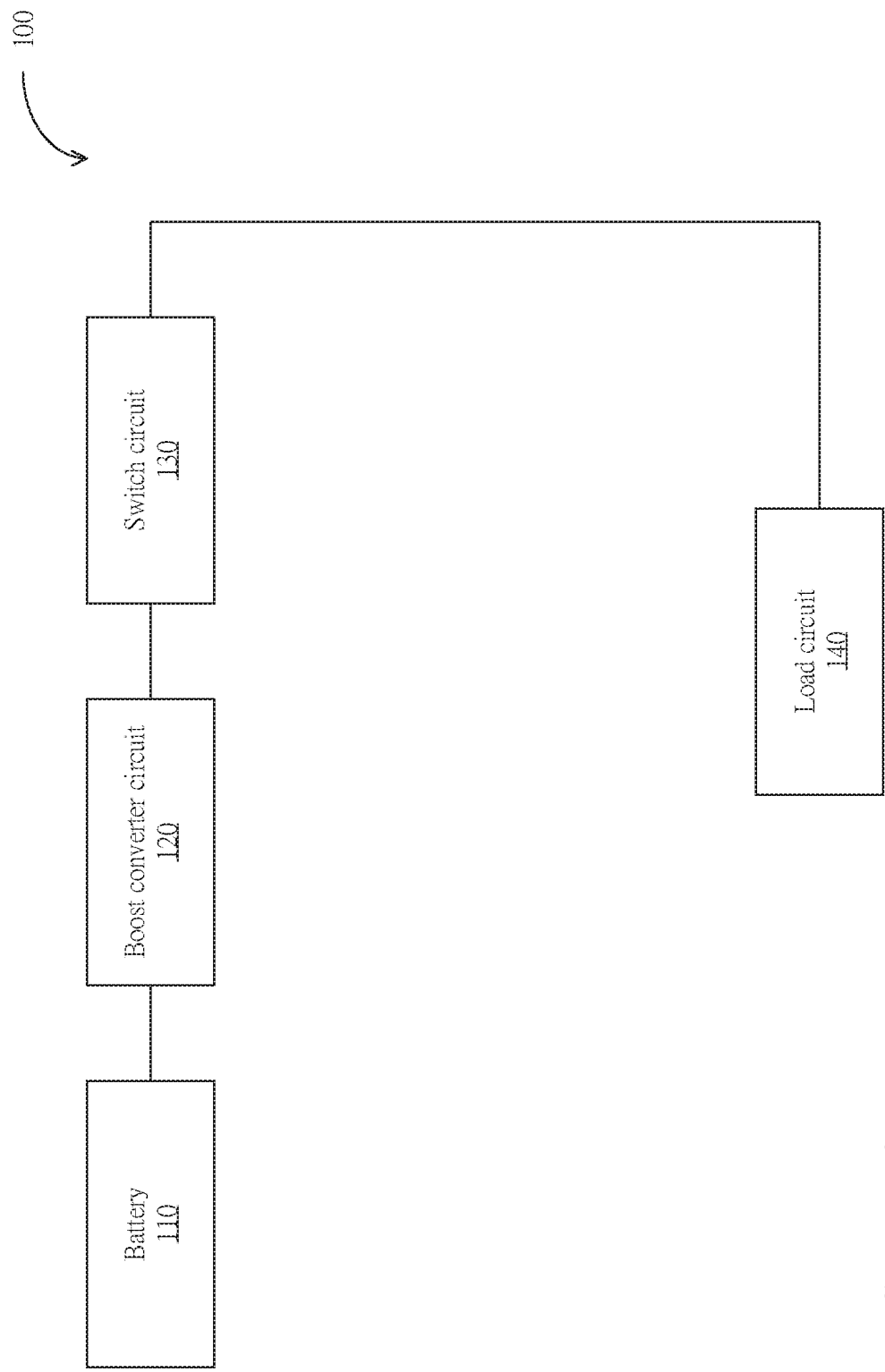
FIG. 1 shows a block diagram of an existing stylus.

Some embodiments of the present invention are described in detail below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 2:
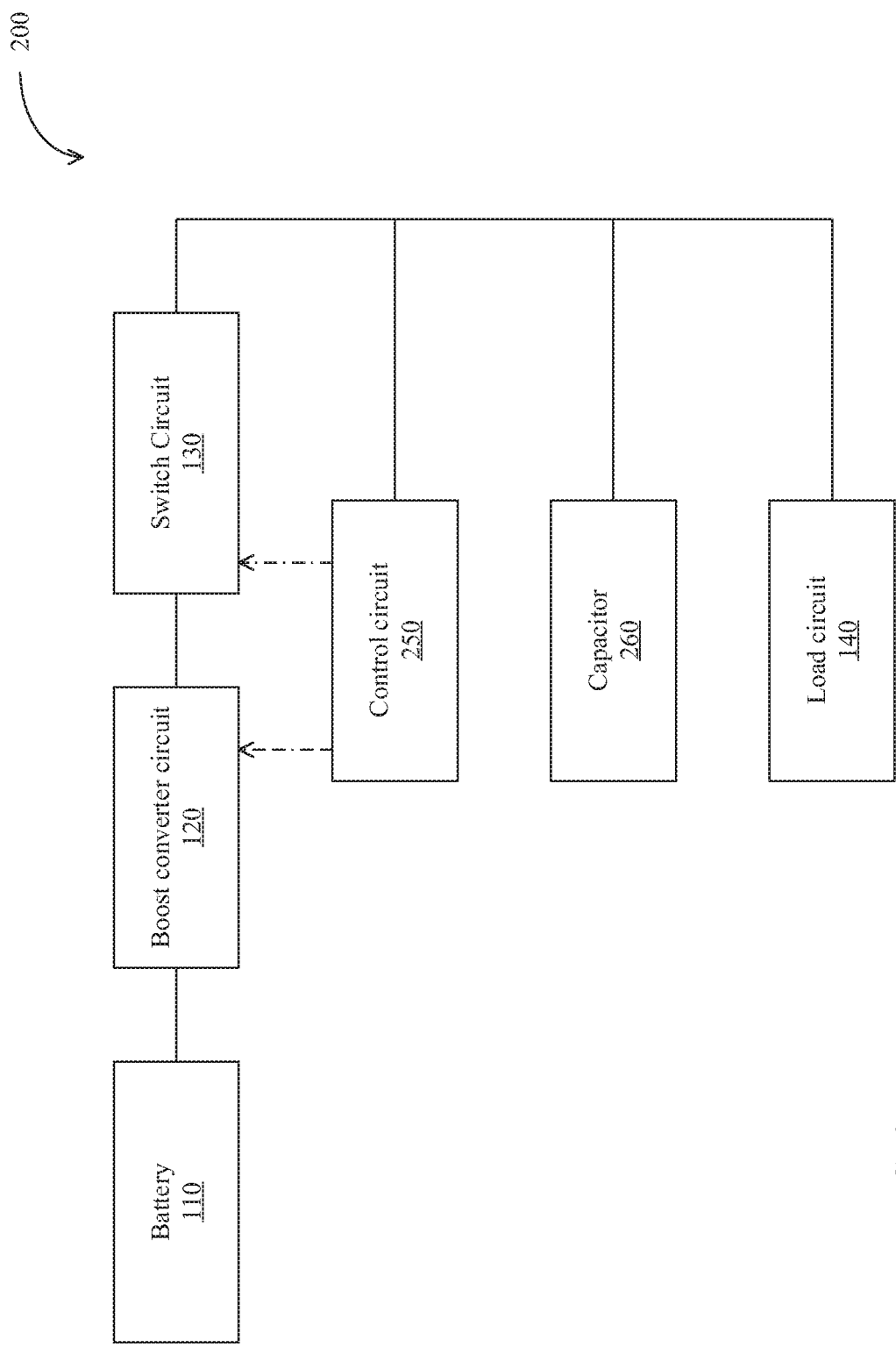
FIG. 2 shows a schematic block diagram for a stylus according to an embodiment of the present invention.

Referring to FIG. 2, a schematic block diagram for a stylus 200 according to an embodiment of the present invention is illustrated. The stylus 200 includes the abovementioned battery 110, boost converter circuit 120, switch circuit 130, and load circuit 140. Besides, the stylus 200 further includes a control circuit 250, and at least one capacitor 260 which all couple in parallel to the output of the switch circuit 130. The control circuit 250 can measure the voltage of the input end to control enabling and disabling the boost converter circuit 120 and the switch circuit 130. These components are grounded in common, so omit not to show.

When the boost converter circuit 120 is working and is outputting to the load circuit 140 via the switching circuit 130, the boost converter circuit 120 also supplies power to the capacitor 260 at the same time. The main power-saving mechanism of the present application is that when the electricity of the capacitor 260 is more than a certain level, the boost converter circuit 120 which consumes larger power is just disabled or turned off, and the switch circuit 130 is set to opened circuit to change the power of the load circuit 140 being supplied by the capacitor 260. Because the voltage outputted from the capacitor 260 is larger than the voltage outputted from the battery 110, it can be directly supplied to the load circuit 140 without having to be boosted by the boost converter circuit 120. When the electricity of the capacitor 260 is gradually consumed by the load circuit 140, the boost converter circuit 120 which consumes larger power is enabled or turned on, and the switch circuit 130 is set to closed circuit to change the power of the load circuit 140 being supplied by the battery 110.

In one embodiment, the load circuit 140 of the stylus 200 is the implementation of the various types of methods, circuits and systems of emitting electrical signals mentioned in the abovementioned Taiwan patent No. I540472 and its domestic and foreign related cases, as well as the Taiwan patent application, public number 201519018 application and its division and domestic and foreign counterparts. Since the operating voltage range of the load circuit 140 in these methods, circuits, and systems of emitting electrical signals is larger, especially those embodiments composed of passive components, they can be particularly suitable for the power-saving circuit provided by the present invention. In some stylus 200 with active components, the operating voltage range of the load circuit 140 is smaller, and after applying to the present invention, the proportion of time period that can shut down the boost converter circuit 120 for saving power may be small or may not be significant.

Figure 3A:
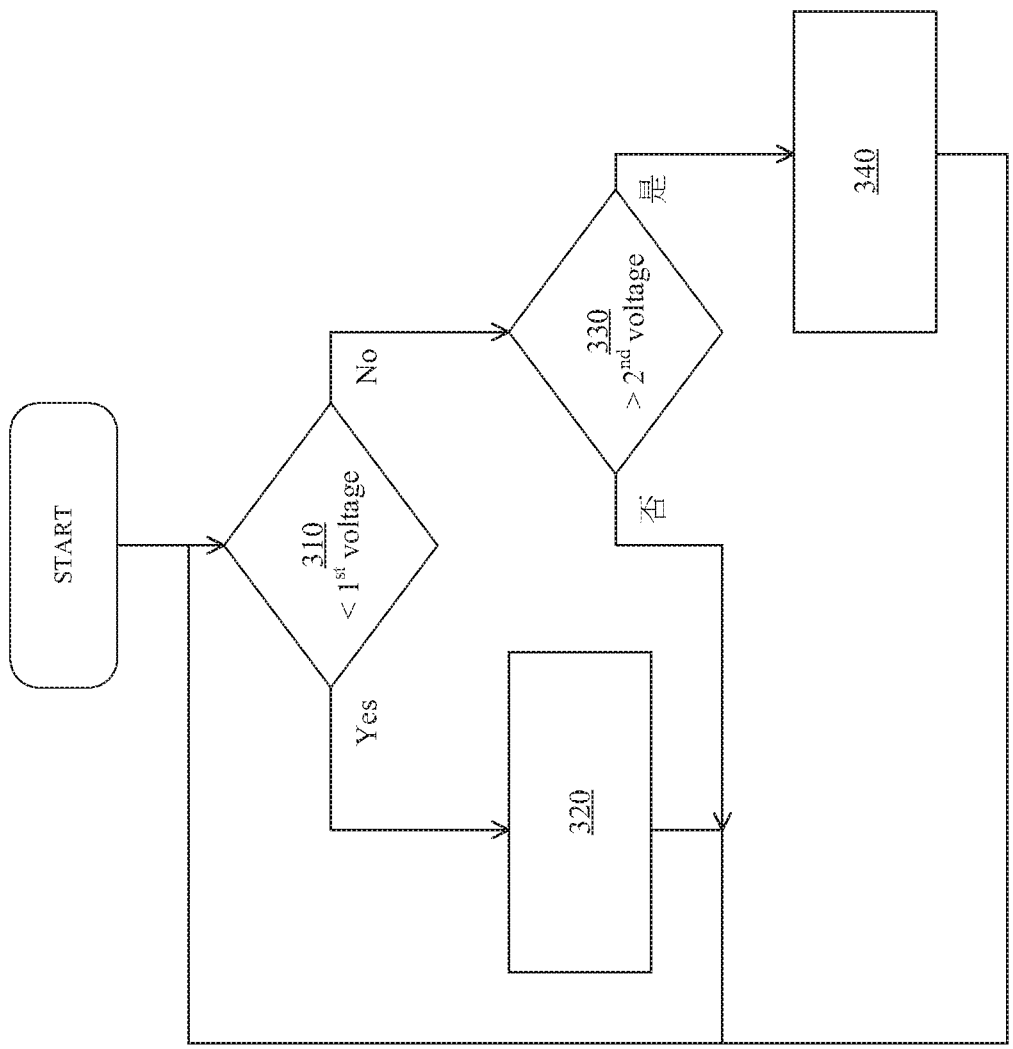
FIG. 3A shows a flowchart of a control method according to an embodiment of the present invention.

Referring to FIG. 3A, it shows a flowchart of a control method according to an embodiment of the present invention. The control method can be implemented by the control circuit 250 shown in FIG. 2, it can be implemented by using active circuit or passive circuit. Since the passive circuit may save more power, the use of passive circuit is a preferred implementation.

In step 310: comparing whether the voltage of input end is less than a first voltage. If yes, it may indicate that the voltage outputted from the capacitor 260 is already insufficient, or that the boost converter circuit 120 just begins to work. Therefore, the process goes to step 320. If no, the process goes to step 330.

In step 320: enabling or turning on the boost converter circuit 120 and connecting or circuit-closed the switch circuit 130, so that the battery 110 supplies power to the load circuit 140 and the capacitor 260. Next, the process goes back to step 310 for the next cycle of monitoring activities.

In step 330: comparing whether the voltage of input end is larger than a second voltage. If yes, it means that the electricity inside the capacitor 260 has reached a certain amount, the process goes to step 340. If no, the status remains the same, and the process goes back to step 310 for the next cycle of monitoring activities.

In step 340: disabling or turning off the boost converter circuit 120 and disconnecting or circuit-opened the switch circuit 130, so that the capacitor 260 supplies power to the load circuit 140. Next, the process goes back to step 310 for the next cycle of monitoring activities.

Figure 3B:
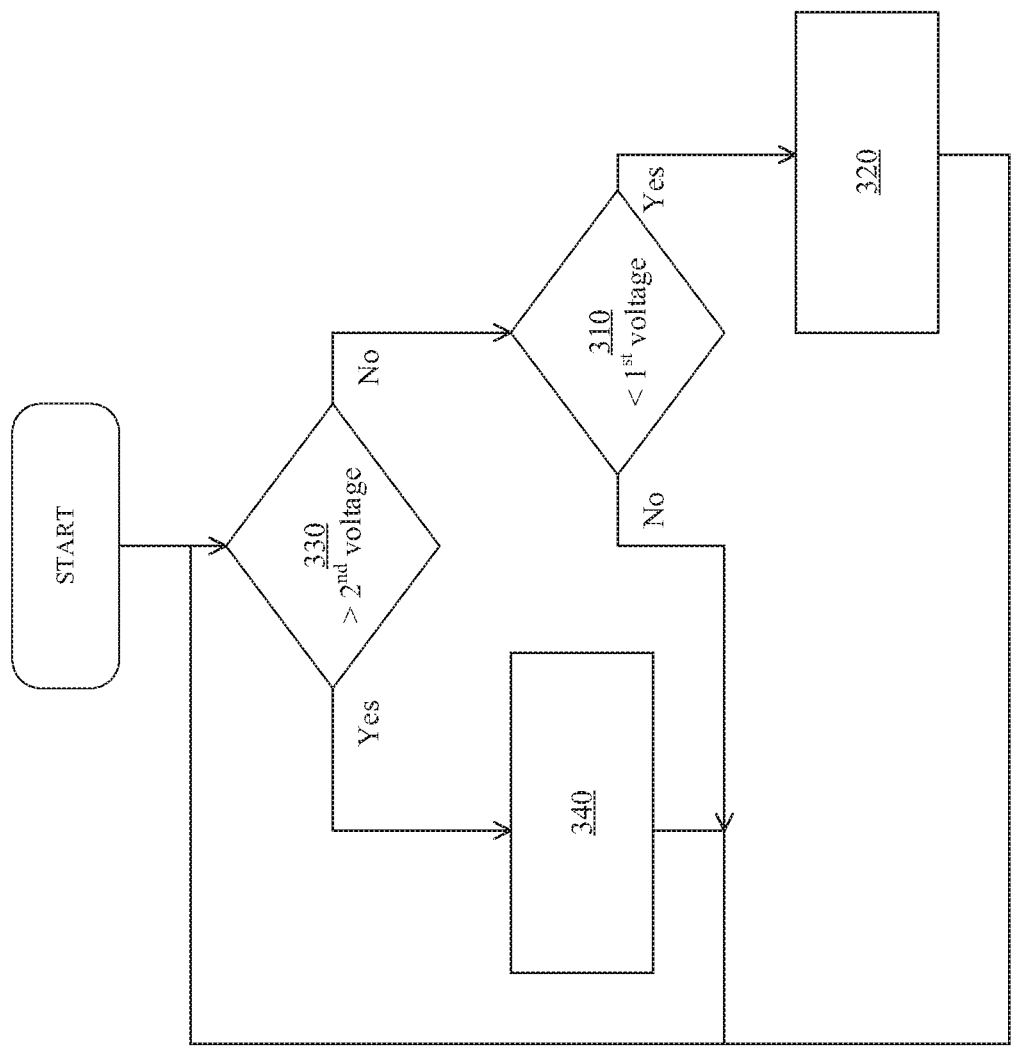
FIG. 3B shows a flowchart of a control method according to another embodiment of the present invention.

Referring to FIG. 3B, it shows a flowchart of a control method according to another embodiment of the present invention. The control method can also be implemented by the control circuit 250 shown in FIG. 2. The steps in FIG. 3B are the same as the steps in FIG. 3A, except that steps 310 and 330 are in the opposite order, and two processes can be said to be equivalent. It can be seen from these two processes that the second voltage (absolute value) is larger than the first voltage (absolute value).

In one embodiment, the first voltage may represent the lower edge of operating voltage of the load circuit 140. In the practical example, the first voltage should be set slightly higher than the lower edge of the real operating voltage. The second voltage may represent the lower edge of operating voltage of the load circuit 140. In the practical example, the second voltage should be set slightly lower than the upper edge of the real operating voltage.

Figure 4A:
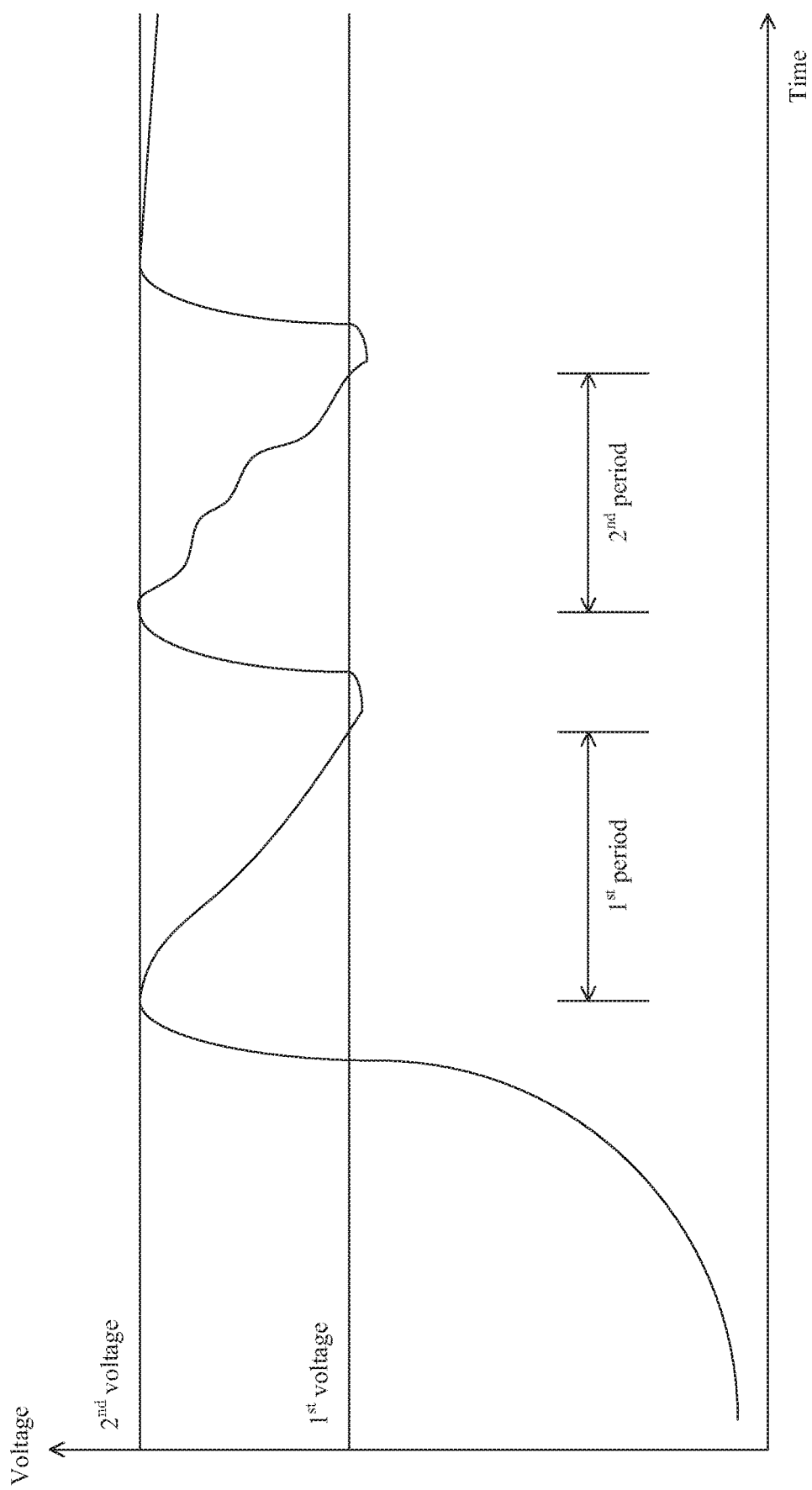
FIG. 4A shows a timing diagram of input voltage of a control circuit according to an embodiment of the present invention.

Referring to FIG. 4A, it shows a timing diagram of input voltage of a control circuit 250 according to an embodiment of the present invention. The horizontal axis of the graph represents the time, and the vertical axis represents the voltage, where the second voltage is larger than the first voltage. At the beginning of the timeline, the total switch of the stylus 200 is turned on. The boost converter circuit 120 boosts the power outputted from the battery 110 and continuously supplies power to the capacitor. Until the first voltage is exceeded, the load circuit 140 can begin to work. Seeing this period is quite long, it also reflects the initial switching time of the stylus 200 is not fast. When the voltage is pulled up to the second voltage, the boost converter circuit 120 is turned off and changing the output of the capacitor 260 to the load circuit 140. Since the load circuit 140 continuously consumes the electricity of the capacitor 260 during the first period, the voltage outputted from the capacitor 260 continues to decline. When the voltage drops to the first voltage, the boost converter circuit 120 is turned on and the battery 110 supplies power to the load circuit 140 and the capacitor 260 after outputting to the boost converter circuit 120.

Once again, when the voltage is pulled up to the second voltage, the boost converter circuit 120 is turned off and the capacitor 260 is outputted to the load circuit 140. Since the load circuit 140 continuously consumes the electricity of the capacitor 260 during the second period, the voltage outputted form the capacitor 260 continues to decline. When the voltage drops to the first voltage, the boost converter circuit 120 is turned on and the battery 110 supplies power to the load circuit 140 and the capacitor 260 after outputting to the boost converter circuit 120.

Since the boost converter circuit 120 is turned off during the first and second periods, in the embodiment of FIG. 4A, the power consumed by the boost converter circuit 120 can be saved during the first and the second periods.

Figure 4B:
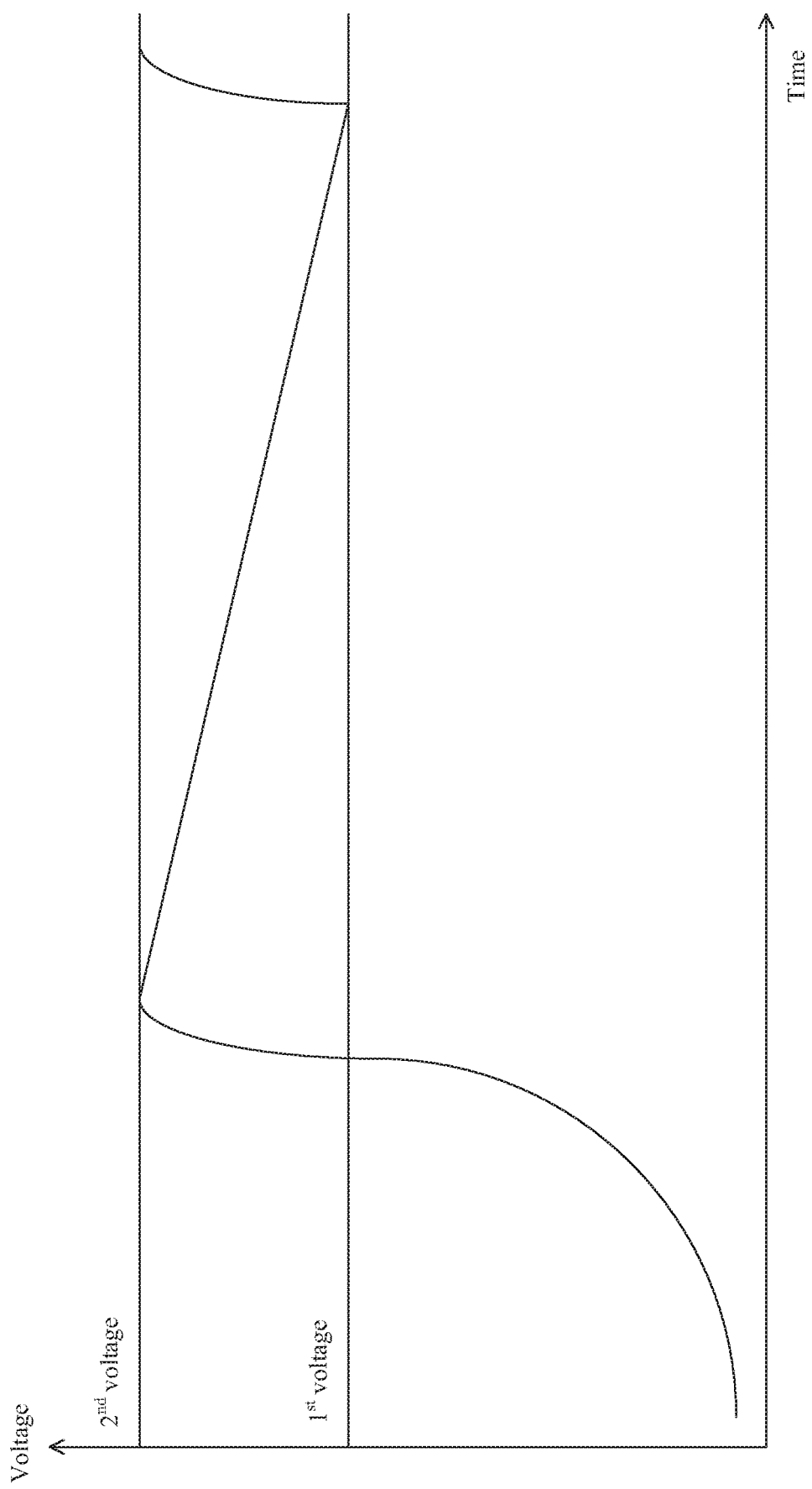
FIG. 4B shows a timing diagram of input voltage of a control circuit according to an embodiment of the present invention.

Referring to FIG. 4B, it shows a timing diagram of input voltage of a control circuit 250 according to an embodiment of the present invention. In this graph, when the capacitor 260 is changed to supply electricity to the load circuit 140, the load circuit 140 is dormant and consumes only the electrical energy of the leakage current. As a result, the boost converter circuit 120 can be turned off over a longer period of time, saving more power.

Whether it is an example of FIG. 4A or FIG. 4B, the boost converter circuit 120 can be turned off during the time when the capacitor 260 supplies electricity, so that the battery 110 reduces the power consumed by the boost converter circuit 120 during these periods. Therefore, the circuit system disclosed by the present application can effectively extend the battery life and save energy consumption.

Figure 5:
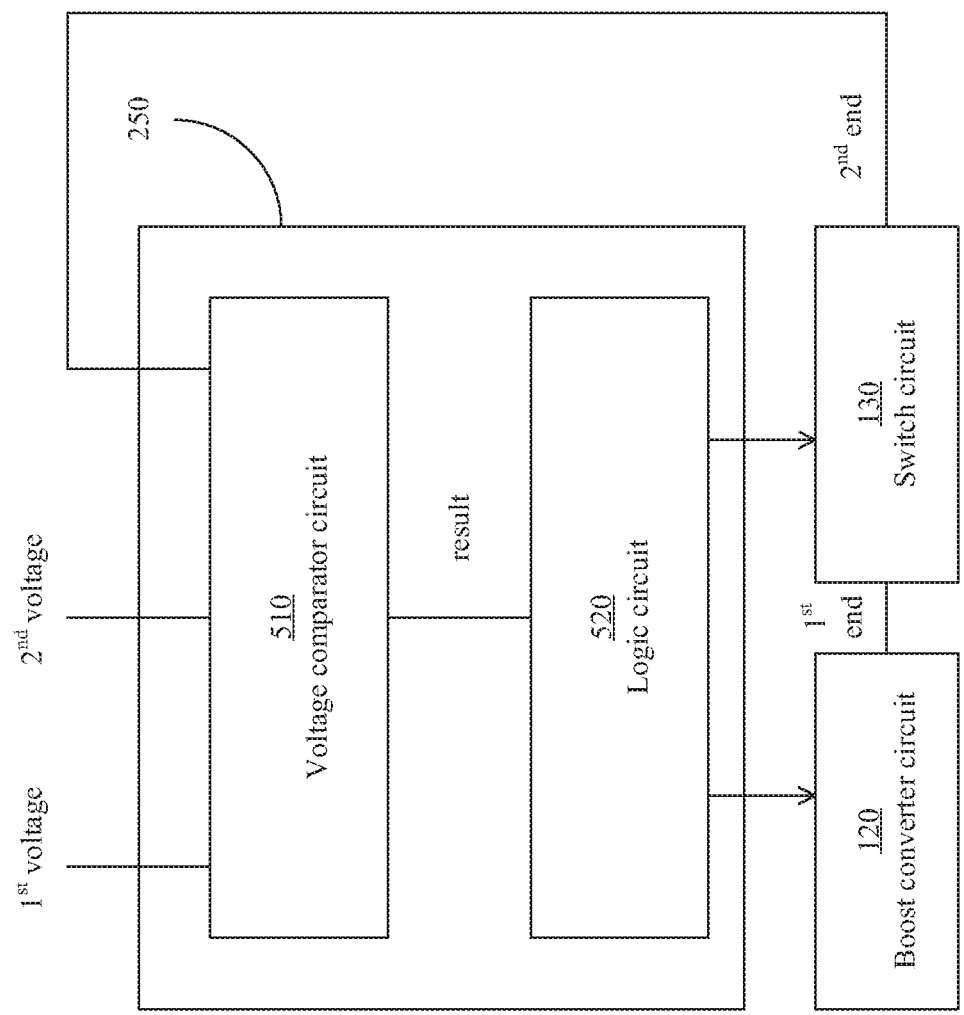
FIG. 5 shows a schematic block diagram for a control circuit according to an embodiment of the present invention.

Referring to FIG. 5, a schematic block diagram for a control circuit 250 according to an embodiment of the present invention is illustrated. The control circuit 250 includes a voltage comparator circuit 510 and a logic circuit 520 receiving comparison results of the voltage comparator circuit 510. The voltage comparator circuit 510 includes three input ends to respectively input the abovementioned first voltage, second voltage, and second end of the switch circuit 130. The voltage comparator circuit 510 can be used to implement the comparing steps 310 and 330 of FIG. 3A and FIG. 3B. When the comparison results of the voltage comparator circuit 510 are received, the logic circuit 520 can be used to implement the steps 320 and 340 of FIG. 3A and FIG. 3B.

Figure 6:
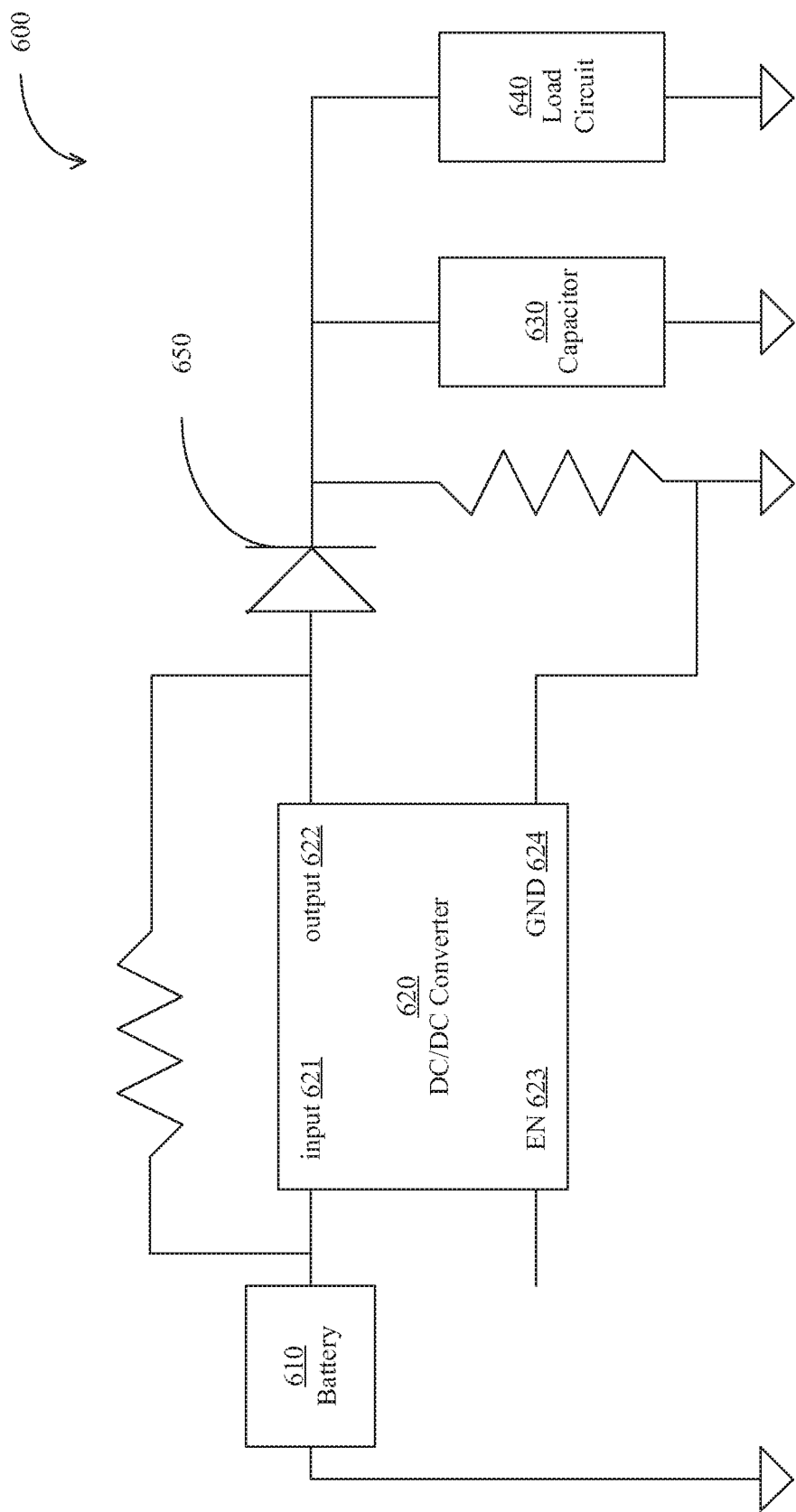
FIG. 6 shows a schematic circuit diagram for a stylus according to an embodiment of the present invention.

Referring to FIG. 6, a schematic circuit diagram for a stylus 600 according to an embodiment of the present invention is illustrated. The stylus 600 includes a battery 610, a DC/DC converter 620, a capacitor 630, a load circuit 640, and a diode 650. Similar to the embodiment of FIG. 2, the battery 610 can correspond to the battery 110 in the embodiment of FIG. 2, the DC/DC converter 620 can be a kind of boost converter circuit 120, the diode 650 can be a kind of switch circuit 130, the capacitor 630 can correspond to the capacitor 260, the load circuit 640 can correspond to the load circuit 140. The embodiment of FIG. 6 includes some resistors that a person having ordinary skill in the art can understand their role and are no longer described. The embodiment of FIG. 6 is a variety of the embodiment of FIG. 2.

The DC/DC converter 620 includes four ports. An input end 621 is connected to a battery, which accepts a lower voltage outputted from the battery. An output end 622 is connected to the diode 650, which outputs a DC voltage higher than the voltage outputted from the battery. An enabling end 623 is connected to a control circuit or a control logic circuit for receiving an enabling signal. When the enabling signal represents a first logical state, the DC/DC converter 620 is in a working or enabling state, that is, the current of the lower voltage inputted form the input end 621 is converted to the current of higher voltage outputted at the output end 622. When the enabling signal represents a second logical state, the DC/DC converter 620 is not in the working or enabling state. Understandably, the DC/DC converter 620, which is not in working state, can save a lot of power. A ground end 624 is responsible for connecting the ground potential of the stylus 600.

When the voltage outputted from the diode 650 is higher than the second voltage, the control circuit will output the enabling signal of the second logical state to the enabling end 623 to turn off the DC/DC converter 620. At this time, because the voltage at the input end of the diode 650 is lower than the voltage at the output end thereof which is outputted from the capacitor 630, the circuit of the diode 650 is not conductive. The power required for the load circuit 640 is provided by the capacitor 630.

When the voltage outputted from the capacitor 630 is lower than the first voltage, the control circuit will output the enabling signal of the first logical state to the enabling end 623, so that the DC/DC converter 620 returns to the working state. At this time, because the voltage at the input end of the diode 650 is higher than the voltage at the output end thereof which is outputted from the capacitor 630, the circuit of the diode 650 is conductive. The power required for load circuit 640 is provided by the DC/DC converter 620 and its source battery 610, while the capacitor 630 is also charged by the DC/DC converter 620 and its source battery 610.

According to an embodiment of the present invention, it provides a stylus for saving power. The stylus includes: a battery for supplying power to the stylus; a boost converter circuit, coupled to the battery, for increasing voltage of direct current outputted from the battery; a switch circuit including a first end coupled to an output of the boost converter circuit and a second end; a load circuit, coupled to the second end of the switch circuit, for emitting an electrical signal to a touch screen or panel to have a touch sensitive processing apparatus of the touch screen or panel know a position of the stylus on the touch screen or panel according to the electrical signal; a capacitor, coupled to the second end of the switch circuit, for storing and discharging electric power; and a control circuit, coupled to the boost converter circuit and the switch circuit, for implementing the following steps: if the voltage of the second end is less than a first voltage, enabling the boost converter circuit and having the switch circuit connect the first and the second ends; and if the voltage of the second end is larger than a second voltage, disabling the boost converter circuit and having the switch circuit disconnect the first and the second ends, wherein the second voltage is larger than the first voltage.

According to an embodiment of the present invention, it provides a circuit system for saving power. The circuit system includes: a battery for supplying power; a boost converter circuit, coupled to the battery, for increasing voltage of direct current outputted from the battery; a switch circuit including a first end coupled to an output of the boost converter circuit and a second end; a load circuit, coupled to the second end of the switch circuit; a capacitor, coupled to the second end of the switch circuit, for storing and discharging electric power; and a control circuit, coupled to the boost converter circuit and the switch circuit, for implementing the following steps: if the voltage of the second end is less than a first voltage, enabling the boost converter circuit and having the switch circuit connect the first and the second ends; and if the voltage of the second end is larger than a second voltage, disabling the boost converter circuit and having the switch circuit disconnect the first and the second ends, wherein the second voltage is larger than the first voltage.

In the embodiment, for implementing the boost converter circuit, wherein the boost converter circuit includes one of or any combination of the following: DC/DC converter; and charge pump.

In the embodiment, for implementing the switch circuit, wherein the switch circuit includes a diode.

In the embodiment, for directly outputting electric power to the load circuit, wherein the voltage outputted from the capacitor is larger than the voltage outputted from the battery. It can fall on the operating voltage range of the load circuit.

According to an embodiment of the present invention, it provides a control circuit for saving power which is applicable to a circuit system. Wherein the circuit system includes: a battery for supplying power; a boost converter circuit coupled to the battery; a switch circuit; a load circuit coupled to the switch circuit; and a capacitor coupled to the switch circuit. Wherein the boost converter circuit increases voltage of direct current outputted from the battery, the switch circuit includes a first end and a second end, the first end couples to an output of the boost converter circuit, the second end couples to the load circuit and the capacitor. Wherein the control circuit includes: a voltage comparator circuit, comparing the voltage of the second end of the switch circuit with a certain voltage; and a logic circuit, receiving comparison results of the voltage comparator circuit, if the voltage of the second end is less than a first voltage, enabling the boost converter circuit and having the switch circuit connect the first and the second ends; and if the voltage of the second end is larger than a second voltage, disabling the boost converter circuit and having the switch circuit disconnect the first and the second ends, wherein the second voltage is larger than the first voltage.

According to an embodiment of the present invention, it provides a control method for saving power which is applicable to a circuit system. Wherein the circuit system includes: a battery for supplying power; a boost converter circuit coupled to the battery; a switch circuit; a load circuit coupled to the switch circuit; and a capacitor coupled to the switch circuit. Wherein the boost converter circuit increases voltage of direct current outputted from the battery, the switch circuit includes a first end and a second end, the first end couples to an output of the boost converter circuit, the second end couples to the load circuit and the capacitor. Wherein the control method includes: if the voltage of the second end is less than a first voltage, enabling the boost converter circuit and having the switch circuit connect the first and the second ends; and if the voltage of the second end is larger than a second voltage, disabling the boost converter circuit and having the switch circuit disconnect the first and the second ends, wherein the second voltage is larger than the first voltage.

In some embodiments, the circuit systems, control circuits, and control methods mentioned above can be applied to a stylus, especially to an active stylus. The load circuit described above is used to emit an electrical signal to a touch screen or panel so that a touch sensitive processing apparatus of the touch screen or panel knows the stylus's position on the touch screen or panel according to the electrical signal. In some embodiment, the capacitor 130 or 630 is able to supply energy entirely required by the load circuit 140 or 640 without energy output from the battery 610.

According to the styluses, circuit systems, control circuits and control methods provided in this application, a boost converter circuit with a large power consumption can be turned off during the power is supplied by the capacitor. By doing so, not only can the active stylus or circuit system switch faster from the power-saving mode to the working mode, but the energy consumption of the active stylus or circuit system also can be saved.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A stylus for saving power, comprising:
a battery for supplying power to the stylus;
a boost converter circuit, coupled to the battery, for increasing voltage of direct current outputted from the battery;
a switch circuit comprising a first end and a second end, wherein the first end is coupled to an output of the boost converter circuit;
a load circuit, coupled to the second end of the switch circuit, for emitting an electrical signal to a touch screen or panel to have a touch sensitive processing apparatus of the touch screen or panel know a position of the stylus on the touch screen or panel according to the electrical signal;
a capacitor, coupled to the second end of the switch circuit, for storing and discharging electric power for solely supplying the load circuit; and
a control circuit, coupled to the boost converter circuit and the switch circuit, for implementing the following steps:
if the voltage of the second end is less than a first voltage, enabling the boost converter circuit and having the switch circuit connect the first and the second ends; and
if the voltage of the second end is larger than a second voltage, disabling the boost converter circuit and having the switch circuit disconnect the first and the second ends,
wherein the second voltage is larger than the first voltage.

2. The stylus according to claim 1, wherein the boost converter circuit comprises one of or any combination of the following:
DC/DC converter; and
charge pump.

3. The stylus according to claim 1, wherein the switch circuit comprises a diode.

4. The stylus according to claim 1, wherein the voltage outputted from the capacitor is larger than the voltage outputted from the battery.

5. A circuit system for saving power, comprising:
a battery for supplying power;
a boost converter circuit, coupled to the battery, for increasing voltage of direct current outputted from the battery;
a switch circuit comprising a first end and a second end, wherein the first end is coupled to an output of the boost converter circuit;
a load circuit, coupled to the second end of the switch circuit;
a capacitor, coupled to the second end of the switch circuit, for storing and discharging electric power for solely supplying the load circuit; and
a control circuit, coupled to the boost converter circuit and the switch circuit, for implementing the following steps:
if the voltage of the second end is less than a first voltage, enabling the boost converter circuit and having the switch circuit connect the first and the second ends; and
if the voltage of the second end is larger than a second voltage, disabling the boost converter circuit and having the switch circuit disconnect the first and the second ends,
wherein the second voltage is larger than the first voltage.

6. The circuit system according to claim 5, the boost converter circuit comprises one of or any combination of the following:
DC/DC converter; and
charge pump.

7. The circuit system according to claim 5, wherein the switch circuit comprises a diode.

8. The circuit system according to claim 5, wherein the voltage outputted from the capacitor is larger than the voltage outputted from the battery.

9. A control circuit for saving power, being applicable to a circuit system, wherein the circuit system comprises a battery for supplying power, a boost converter circuit coupled to the battery, a switch circuit, a load circuit coupled to the switch circuit, and a capacitor coupled to the switch circuit, wherein the boost converter circuit increases voltage of direct current outputted from the battery, the switch circuit comprises a first end and a second end, the first end couples to an output of the boost converter circuit, the second end couples to the load circuit and the capacitor, wherein the control circuit comprises:
a voltage comparator circuit, comparing the voltage of the second end of the switch circuit with a certain voltage; and
a logic circuit, receiving comparison results of the voltage comparator circuit, if the voltage of the second end is less than a first voltage, enabling the boost converter circuit and having the switch circuit connect the first and the second ends; and if the voltage of the second end is larger than a second voltage, disabling the boost converter circuit and having the switch circuit disconnect the first and the second ends such that the capacitor discharging stored electric power for solely supplying the load circuit, wherein the second voltage is larger than the first voltage.

10. A control method for saving power, being applicable to a circuit system, wherein the circuit system comprises a battery for supplying power, a boost converter circuit coupled to the battery, a switch circuit, a load circuit coupled to the switch circuit, and a capacitor coupled to the switch circuit, wherein the boost converter circuit increases voltage of direct current outputted from the battery, the switch circuit comprises a first end and a second end, the first end couples to an output of the boost converter circuit, the second end couples to the load circuit and the capacitor, wherein the control method comprises:
   if the voltage of the second end is less than a first voltage, enabling the boost converter circuit and having the switch circuit connect the first and the second ends; and
   if the voltage of the second end is larger than a second voltage, disabling the boost converter circuit and having the switch circuit disconnect the first and the second ends such that the capacitor discharging stored electric power for solely supplying the load circuit,
wherein the second voltage is larger than the first voltage.

\* \* \* \* \*